(12) United States Patent
Govindaraj et al.

(10) Patent No.: US 7,050,859 B1
(45) Date of Patent: *May 23, 2006

(54) SYSTEMS AND METHODS TO PORT CONTROLLER STATE AND CONTEXT IN AN OPEN OPERATING SYSTEM

(75) Inventors: Subbian Govindaraj, Solon, OH (US); David W. Heller, Twinsburg, OH (US); Steven Mark Cisler, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 213 days.

This patent is subject to a terminal disclaimer.

(21) Appl. No.: 10/447,081

(22) Filed: May 28, 2003

Related U.S. Application Data (63) Continuation-in-part of application No. 10/261,649, filed on Sep. 30, 2002, now Pat. No. 6,901,298.

(51) Int. Cl.
*G05B 15/00* (2006.01)

(52) U.S. Cl. ................ 700/1; 700/9; 700/20; 700/21; 700/79; 700/86; 700/87; 710/13; 710/104; 711/115; 713/1; 713/2; 713/100; 714/15; 714/21; 717/168; 717/174

(58) Field of Classification Search ................ 700/1, 700/21, 79, 86, 87, 9, 20; 710/13, 104; 711/115; 713/1, 2, 100; 714/15, 21; 717/168, 174
See application file for complete search history.

(56) References Cited

U.S. PATENT DOCUMENTS

| | | | |
|---|---|---|---|
| 4,837,822 A * | 6/1989 | Crosley et al. ............. 713/185 |
| 5,430,841 A | 7/1995 | Tannenbaum et al. |
| 5,519,663 A * | 5/1996 | Harper et al. ................ 365/229 |
| 5,597,307 A * | 1/1997 | Redford et al. ............. 434/118 |
| 5,781,921 A * | 7/1998 | Nichols ....................... 711/115 |
| 5,812,823 A | 9/1998 | Kahle et al. |
| 5,943,201 A * | 8/1999 | Walker et al. ................ 361/64 |
| 6,038,640 A * | 3/2000 | Terme ......................... 711/115 |
| 6,222,562 B1 | 4/2001 | Leidich |
| 6,243,771 B1 | 6/2001 | Van Gasteren et al. |
| 6,401,163 B1 * | 6/2002 | Kondo et al. ................ 711/100 |
| 6,449,518 B1 * | 9/2002 | Yokoo et al. ................. 700/86 |
| 6,553,444 B1 * | 4/2003 | Holmquist et al. .......... 710/301 |

(Continued)

*Primary Examiner*—Anthony Knight
*Assistant Examiner*—Douglas Shute
(74) *Attorney, Agent, or Firm*—Amin & Turocy, LLP; R. Scott Speroff (57) ABSTRACT

The present invention relates to systems and methods to port controller state and context via non-volatile portable memory to controllers employing an open operating system. The present invention provides for saving a controller's state and context, for example after the controller has been suitably configured. The saved image can then be employed for subsequent controller startups to resume a particular state and context, utilized during maintenance to return a controller to a previously saved state and context, and employed to efficiently configure similar controllers via porting and/or loading the saved image to the similar controllers, which mitigates manual controller configuration. The present invention can be employed in connection with various industrial controller designs, memory configurations, and data transfer techniques. In addition, the present invention provides for serial and/or concurrent state and context transfers between controllers and memory devices.

49 Claims, 10 Drawing Sheets

U.S. PATENT DOCUMENTS

| | | |
|---|---|---|
| 6,697,954 B1 | 2/2004 | Stufflebeam |
| 6,749,503 B1 | 6/2004 | Kazama et al. |
| 6,766,476 B1 | 7/2004 | Matsufusa |
| 6,809,779 B1* | 10/2004 | Chang et al. ............... 348/734 |
| 2002/0023236 A1 | 2/2002 | Obitsu |
| 2002/0054212 A1* | 5/2002 | Fukuoka .................... 348/207 |
| 2002/0078394 A1* | 6/2002 | King ............................ 714/2 |
| 2002/0087959 A1* | 7/2002 | Mangold et al. ............ 717/168 |

* cited by examiner

SYSTEMS AND METHODS TO PORT CONTROLLER STATE AND CONTEXT IN AN OPEN OPERATING SYSTEM

CROSS REFERENCE TO RELATED APPLICATIONS

This application is a continuation-in-part application of U.S. patent Ser. No. 10/261,649, now U.S. Pat. No. 6,901,298 filed Sep. 30, 2002 entitled SAVING & RESTORING CONTROLLER STATE & CONTEXT IN AN OPEN OPERATING SYSTEM, which is hereby fully incorporated by reference.

TECHNICAL FIELD

The present invention generally relates to industrial control systems, and more particularly to systems and methods to port an industrial controller's state and context via nonvolatile, portable memory.

BACKGROUND OF THE INVENTION

The programmable logic controller ("PLC" or "controller") is commonly used in industry in connection with electrical, mechanical, hydraulic and pneumatic systems and processes to control the systems and processes. Control is typically achieved via virtual relays, contactors, counters, timers and other electromechanical devices, for example. The controller can encapsulate the virtual devices and functionality through hardware, software and firmware that can be configured by a user (e.g., user written, application specific code).

Typically, a User Interface (UI) is utilized to configure a controller, for example to write and download user programs. For example, the UI can be employed to customize a controller for a particular process. Customization can be applied through control software that can be stored in the controller's memory and/or by changing the hardware configuration of the controller. Employing configurable controllers provides the user with a customizable control mechanism that can be employed to semi-automate and/or automate a factory, which can reduce operating cost, mitigate maintenance and increase flexibility.

The basic controller comprises a plurality of modules such as a control module(s), an interface module(s) and an I/O module(s), for example, that can be interchangeable (e.g., hot swapping) and replaceable. The modules additionally can provide access between the controller and the environment. For example, the I/O module can be employed to interact with other controllers and devices, and various other stimuli. For example, an input channel of the I/O module can be employed to receive analog and digital signals through sensors, switches and the like that provide information indicative of state(s) (e.g., on/off) and/or relating to a process(s). The received input can be stored in memory and utilized to determine a next state. For example, programmable code running in system memory can execute instructions (e.g., in a sequential manner) and can employ the saved input to determine the next state. An output channel of the I/O module can then be employed to convey the next state to an instrument under the control of the controller.

The industrial controller differs from a conventional (e.g., general purpose) computer in several aspects. For example, unlike conventional computers, an industrial controller is designed to operate in an industrial environment with varying temperatures, humidity, pressure, electrical noise, mechanical vibration and particulates in the air. Moreover, the controller can be designed for quick access for installation, maintenance and troubleshooting by plant personnel, and to operate within often-harsh operating conditions indicative of a manufacturing environment.

A single controller can be employed to control an individual device or multiple devices. Likewise, multiple controllers can be employed to control an individual device or multiple devices. Employing multiple controllers provides for distributed control in a plant, wherein control can be delineated amongst various controllers that can be operative to a similar backplane and/or coupled through one or more communication links, and can be selectively employed. However, configuring multiple controllers can be time inefficient. For example, independently setting-up a plurality of controllers with a substantially similar configuration can be time consuming. In addition, replacing a controller and/or controller hardware typically entails configuring the replacement and/or the modified controller with the previous configuration, which can increase maintenance cost and plant downtime.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods to save a state and context associated with a controller employing an open operating system, and subsequently utilize the saved state and context as a startup image for the controller and/or similar controllers. In general, a controller can be setup for a particular application such as controlling one or more devices. In many instances, it can be advantageous to save a mirror image of the controller state and context and customer programs in a non-volatile, portable memory device. For example, the saved image can then be employed to mitigate manual configuration (e.g., re-configuration) of the controller and/or manual configuration of the similar controllers. Thus, the foregoing can reduce the amount of time, and thus cost, associated with restoring/resuming the controller's configuration and/or configuring a plurality of similar controllers. In addition, the foregoing can eliminate manual entry errors that can result in incorrect operation and time spent to correct the problems.

In one aspect of the present invention, a system comprising an information management component and a portable storage component (e.g., portable memory) is illustrated. The system can be employed in connection with an industrial controller and/or PLC employing an open operating system. The information management component can interface the controller and the portable storage component, and can be employed to copy a controller state and context (e.g., operating system context) to the portable storage component and/or load a saved state and context from the portable storage component to the controller. The foregoing provides for saving a controller's state and context such that it can be employed as a startup image for subsequent controller startups, to return a controller to a particular state and context (e.g., after maintenance) and to configure similar controllers.

In another aspect of the present invention, a method to save controller state and context to portable memory is illustrated. The method comprises interfacing a portable memory such as flash memory to a controller. After the controller is suitably configured, a manual and/or automatic mechanism (e.g., on-demand) can be employed to initiate a save request. Upon receiving the save request, any portable memory operative to the controller is identified via techniques including polling for devices and/or intelligent identification. If no portable memory is located, then the save request is aborted and/or the operator can be notified. However, if portable memory is located, then the integrity of the portable memory is verified. Then, the current state and context, customer applications, and a signature (e.g., electronic) can be copied to the portable memory. The signature can provide a mechanism to mitigate porting the saved state and context to non-compatible controllers via providing and/or denying access to the image. Optionally, verification and validation can be subsequently employed to ensure the integrity of the saved state and context.

In another aspect of the present invention, a method to load a saved controller state and context is illustrated. After interfacing a portable memory with a saved state and context with a controller, a manual and/or automatic mechanism can be employed to provide a load request. The load initiates a search for portable memory coupled to the controller. Portable memory that is located can be scrutinized to determine whether a valid state and context image exists. If a valid image does not exist, then the load request can be aborted and/or the operator can be notified. However, if a valid image exists, then the signature can be checked to ensure that the image and controller are compatible. After verification, the state and context can be transferred from the portable memory to the controller, and employed by the controller.

In yet another aspect of the present invention, a method to employ a saved controller state and context as a startup image is illustrated. Upon controller startup, portable memory operative to the controller is identified and searched for valid state and context, and a signature indicative of the compatibility. If a compatible and valid image exists, the image is loaded and employed by the controller. Optionally, the controller can be cycled through a warm boot in order to load the state and context in the controller's flash memory, if such memory exists. If portable memory is not located, then the controller's non-volatile memory is searched for a saved state and context. If a valid image exists, the image is loaded and employed by the controller. Similar to the above, the controller can be warm booted to facilitate updating the controller. If it is determined that a compatible and valid image is not accessible, then the controller can be cycled through a cold boot, wherein a default, or minimal configuration, can be loaded and/or the operator can provide a manually loaded configuration.

Additional aspects of the present invention provide for transferring state and context between one or more controllers and one or more memories, while employing various components to facilitate the transfers. Furthermore, exemplary controllers are provided that can employ the novel aspects of the invention. Moreover, the exemplary controllers can be associated with various data transfer techniques and memory configurations, including the employment of magnetoresistive random access memory (MRAM).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A thread is the entity within a process that the operating system kernel schedules for execution. As is well known in the art, each thread has an associated context, which is the volatile data associated with the execution of the thread. A thread's context includes the contents of system registers and the virtual address belonging to the thread's process. Thus, the actual data comprising a thread's context varies as it executes.

The present invention relates to systems and methods to save and port a controller's state and context. Saving the state and a context can provide an image that can be loaded (e.g., employed as a system startup image) during subsequent startups (e.g., application restarts, system boots and power cycles). Thus, the image can be employed to facilitate restoring the state and the context of a controller, for example after system maintenance and/or component replacement. Saving the state and the context to portable medium provides an image that can be ported to a similar system and employed as the similar system's startup image. The foregoing can facilitate configuring a plurality of similar systems, which can reduce setup costs and conserve time.

Figure 1:
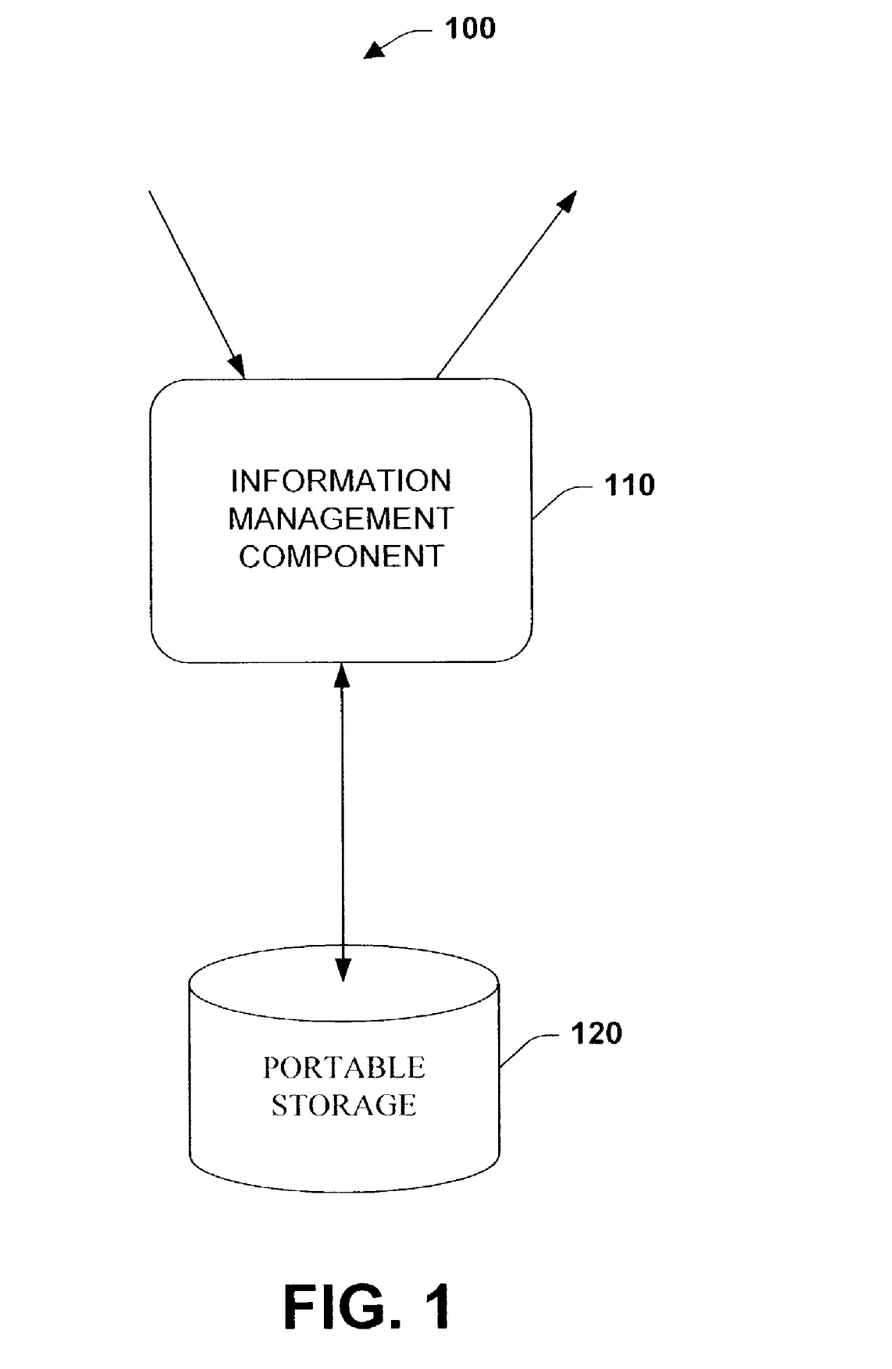
FIG. 1 illustrates an exemplary system to transfer state and context between a controller employing an open operating system and a portable, non-volatile storage medium, in accordance with an aspect of the present invention.

Referring to FIG. 1, a system 100 that facilitates generating and/or porting a startup image comprising at least a state and context is illustrated in accordance with an aspect of the present invention. The system 100 comprises an information management component 110 to facilitate the transfer of state and context and a portable storage component 120 to store state and context. The system 100 can be utilized in connection with a process control device (not shown) such as an industrial controller and/or a programmable logic controller (PLC) employing an open operating system, for example.

The information management component 110 can be utilized to copy the device's state and context (e.g., including operating system context) to the portable storage component 120. For example, after device configuration or setup, the information management component 110 can be employed to access the device's memory (e.g., flash), mirror the state and context and any executing application code, and concurrently and/or subsequently write the mirrored image to the portable storage component 120.

In one aspect of the present invention, the information management component 110 can be manually activated (e.g., on demand) by an external and/or internal stimulus. For example, after the device has been setup and is running in a suitable manner, a user can launch the information management component 110 to save the device's state and context. The launching mechanism can be electro-mechanically based, such as a switch, a lever, a button, and/or voice activation, for example, and/or software based, such as an option within a software application and/or menu executing on the device. In another example, the saving mechanism can be automatically initiated, for example after an event, an interrupt, a control signal and the like that is deployed by the device. In yet another example, the information management component 110 can be executed based on a preset time interval, a statistical inference and/or by another device such as a master device.

It is to be appreciated that the information management component 110 can additionally be utilized to save state and context at any time during configuration. For example, a user can decide to save state and context during configuration, halt or postpone configuration, and resume configuration at a later time. In addition, a corrupt state and context can be saved that can be utilized for troubleshooting the device and/or debugging code. For example, a library can be constructed from corrupt state and context, and utilized by a diagnostic component (not shown) to analyze a malfunctioning device.

Additionally, the information management component 110 can be utilized to copy state and context from the portable storage component 120 and to facilitate loading the device with the copied state and context. For example, as noted above, the device's state and context can be saved to the portable storage component 120, for example after the device is configured and operating in a suitable manner. The saved state and context can then be employed as a startup image for subsequent device startups in order to return the device to a particular state and context. Thus, the present invention mitigates manual device re-configuration (e.g., re-programming) after startup via providing a novel mechanism to efficiently return the device to a particular state and context. Additionally, the saved state and context can be ported via the portable storage 120 to a similar device(s), and utilized as the startup image for the similar device, as described in detail below.

Similar to saving the state and context to the portable storage component 120, the information management component 110 can be user and/or automatically activated (e.g., as described previously) to load the state and context from the portable storage component 120 to the device. For example, a toggle mechanism (e.g., a switch and a lever) can be employed to enable/disable the employment of the stored image after a device startup. For example, the mechanism can be configured such that the stored image is available. Then, the information management component 110 can access the portable storage component 120 during a device restart in order to load the saved state and context to the flash memory of the device, for example. In another example, the mechanism can be configured to disable access to the portable storage component 120. Under such circumstances, the saved state and context will not be loaded after restarting the device. Instead, a default state and context, such as a minimal set of parameters, and/or a configuration utility can be employed.

The portable storage component 120 is typically non-volatile storage, for example flash memory. However, it is to be appreciated that the portable storage component 120 can be volatile storage interfaced with a power source (e.g., a rechargeable battery) to sustain memory content and/or magnetic random access memory (MRAM) (e.g., described infra in connection with FIG. 10). As such, the portable storage component 120 can be decoupled from the information management component 110, wherein the saved state and context remain stored on the portable storage component 120. The portable storage component 120 can then be interfaced with an information management component and/or other suitable component employed in connection with at least one other device. The state and context residing on the portable storage component 120 can then be loaded as a startup image for the at least one other device.

The interface between the information management component 110 and the portable storage component 120 can be a high-speed data/control link. Such links can be uni-directional and/or bi-directional, and can convey information serially and/or in parallel. In addition, data and control can be transmitted over shared and/or dedicated channels. Moreover, such paths can be, for example, electrical and/or optical, and can include protocols such as Ethernet (e.g., Gigabyte), Fire Wire and/or other known high-speed communication protocols.

Figure 2:
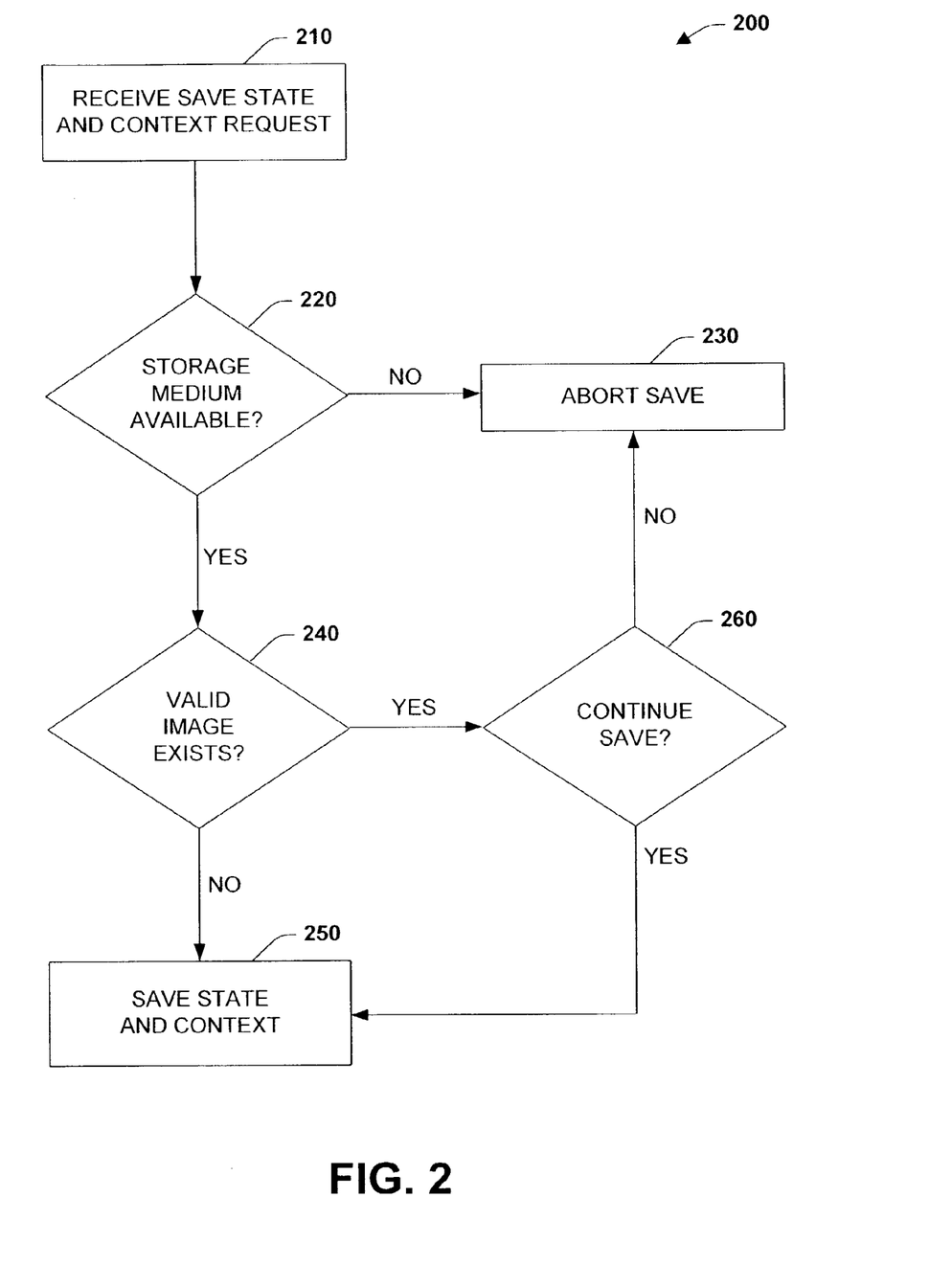
FIG. 2 illustrates a methodology to save controller state and context to portable memory, in accordance with an aspect of the present invention.
Figure 3:
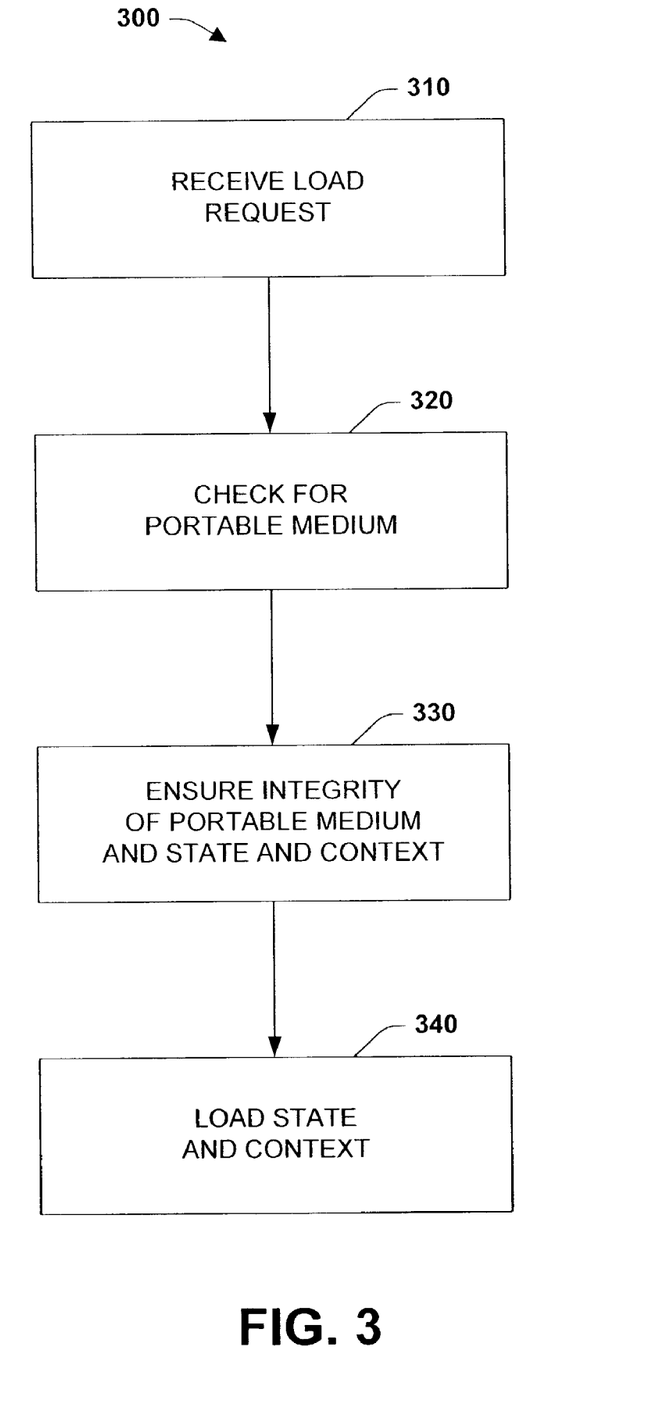
FIG. 3 illustrates a methodology to load state and context from portable memory, to a controller, in accordance with an aspect of the present invention.
Figure 4:
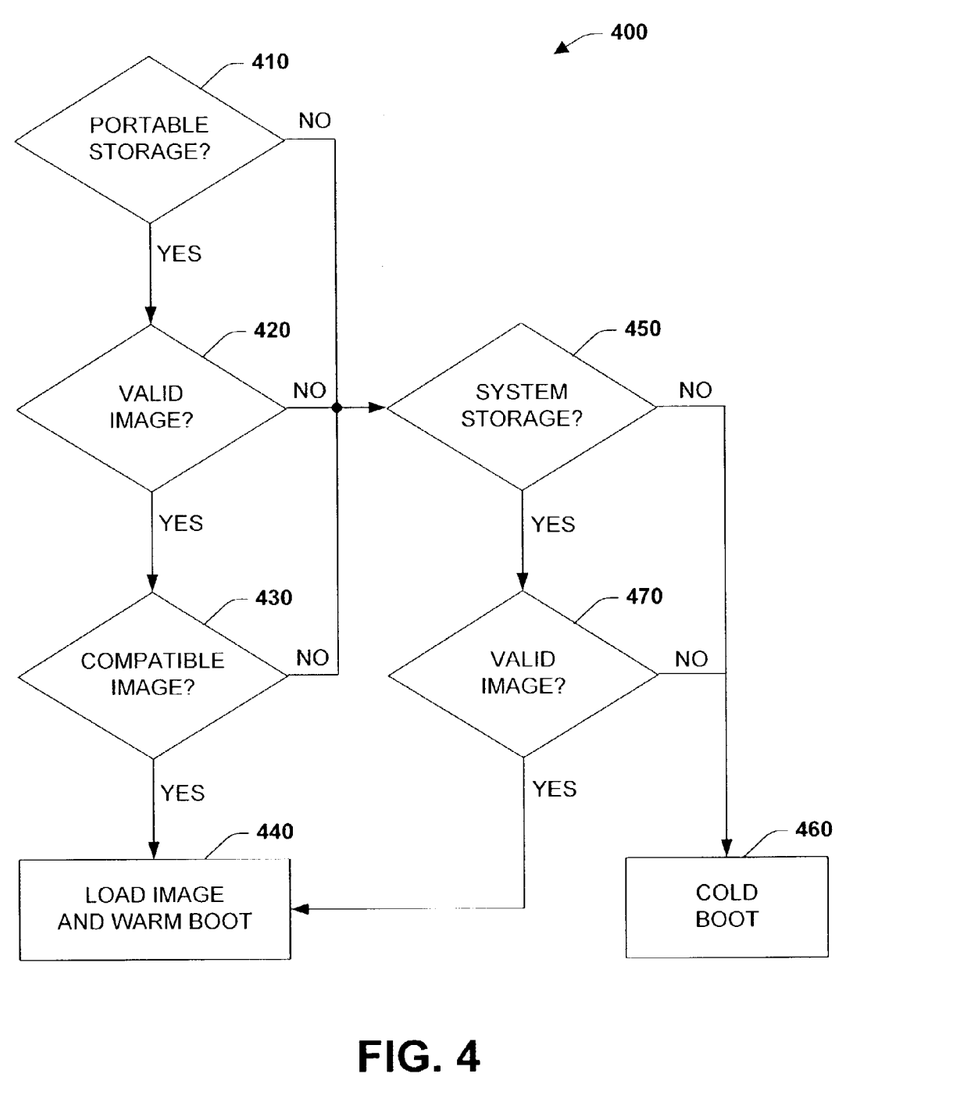
FIG. 4 illustrates a methodology to employ state and context stored in portable memory as a controller's startup image, in accordance with an aspect of the present invention.

FIGS. 2–4 illustrate flow and/or block diagrams relating to methodologies in accordance with the present invention.

While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to FIG. 2, a methodology 200 that can be employed to store controller state and context to portable memory (e.g., portable storage component 120) is illustrated in accordance with an aspect of the present invention. At reference numeral 210, a request to save state and context is received. Typically, before a request is submitted, the controller is configured and is operating in a suitable manner, and portable memory is interfaced to the controller. Furthermore, it is to be appreciated that the controller's system memory can comprise at least the portable memory, and thus removing the portable memory can render the controller inoperable. In other configurations, the controller's system memory can include local memory and/or flash memory, and the portable memory can be utilized to save and port state and context, as described in detail below.

As noted supra, a save request in accordance with the invention can be manual and/or automatic. For example, a controller can be configured for a particular applications and/or basic operation. Then, a manual mechanism such as an on-demand control (e.g., hardware and software) can be employed to initiate saving the controller's state and context. In another example, ending, halting and/or completing controller configuration can automatically initiate saving the controller's state and context. For example, discontinuing configuration (e.g., prior to and/or after completion) can elicit an electrical and/or optical signal, the toggling of a bit, a flag, and/or an interrupt request, for example.

After receiving the save request, portable memory is detected at 220 to determine whether portable memory is available. In one aspect of the present invention, plug-and-play based technology can be employed, wherein merely coupling (e.g., via a bus, a network, an interface and a proprietary protocol) portable memory with the controller can facilitate establishing the existence of the memory. In another aspect of the present invention, a polling technique can be employed to identify any and all of the devices, including memory modules, coupled to the controller. The polling technique can be based on a time interval, on-demand and/or manually initiated.

If portable memory cannot be detected, then at 230 the save request can be aborted. For example, portable memory may not be present. For example, in one aspect of the invention, the controller state and context can be saved to the portable memory, and then the portable memory can be removed. In another aspect of the present invention, the portable memory may be installed incorrectly such that it cannot be identified. In yet another example, the portable memory may be defective and/or the state and context may be corrupt.

After ensuring portable memory exists, then at 240 the portable memory can be scrutinized to determine whether the memory is corrupt and/or whether a valid image currently resides on the memory. For example, the portable memory can be inspected to ensure the integrity via performing small and large data write/read tests, validating checksums and scrutinizing the physical medium cell-by-cell. In addition, a controller's state and context may have been previously saved to the portable memory. The saved image may or may not be valid for the controller. In another example, the controller may have been employing a saved image residing within the portable memory that has become obsolete due to a change in the controller's state and context. In yet another example, the state and context from a similar controller(s) may have been stored on the portable memory.

If it is determined that a valid image is not stored on the portable memory, then at 250 the current state and context, and optionally any executing applications, can be copied from the controller to the portable memory. In addition to the state and context, an identifier such as a hardware and/or firmware signature can be saved to associate the state and context with devices that can employ the state and context. For example, if a controller recognizes the portable memory and that the portable memory includes a valid image, then the signature can be employed to provide and/or deny access to the valid image. For example, the image can be valid, but may not be compatible with the hardware and/or firmware. In another example, the signature can be employed as a security mechanism to selectively determine which devices can employ the image.

If a valid image is stored on the portable memory, then at 260 a decision is rendered as to whether the save should be aborted or continued. For example the user can be prompted that a valid image already exists. The prompt can include an error and/or warning message, and can provide information such as the date the image was saved, the signature, hardware releases, software versions, and/or other information indicative of the state and context. The user can then determine whether to continue or abort the save. In another example, the controller utilizes the foregoing information and renders the decision to continue or abort. The controller can employ "intelligence" to facilitate the decision. For example, a neural network, Bayesian theory and/or other learning techniques can be employed to facilitate the decision.

Determining to abort concludes the save process at reference numeral 230. Determining to continue initiates the transfer of an image of the state and context, including a signature, to the portable memory. Optionally, a verification and validation can be subsequently employed to ensure the integrity of the saved state and context. For example, techniques such as error checking and a data comparison between the controller's state and context and the copy can be employed. If errors are located, then the transfer can be retried and/or the user can be notified.

It is to be appreciated that prior to saving the information, any valid image that was previously stored on the portable memory can be removed, invalidated, or tagged to prevent its utilization. In addition, the existing image can be moved to an archive location for a historical record and/or a back-up image. In another aspect of the present invention, the current state and context can be saved, or written over the existing image.

FIG. 3 illustrates a methodology 300 that can be employed to port saved controller state and context. Proceeding to reference numeral 310, a request to load state and context is received. Typically, portable memory with saved state and context is interfaced to the controller, prior to submitting the load request. The state and context can be stored on the portable device as described above in connection with the methodology 200, for example. For example, a controller's state and context can be saved to a portable memory device after the controller has been configured in order to port the state and context to a similar controller. Thus, in one aspect of the present invention, an operator configuring a controller can utilize another controller's configuration that has been stored on a portable memory device (e.g., CompactFlash) instead of manually configuring the controller.

At reference numeral 320, any portable memory coupled to the controller is identified to determine whether a valid state and context image exists. As noted previously, various techniques can be employed to detect portable memory. For example, polling techniques and/or intelligent techniques (e.g., plug-and-play technology) can be employed. If valid portable memory is not located, then loading can be aborted or halted. In addition, a message can be provided to the operator to facilitate mitigating halting subsequent loading prior to completion. For example, the message can indicate a solution that will allow loading to continue.

If portable memory is detected, then at 330 the portable memory is inspected to ensure memory and image integrity. For example, the inspection can employ techniques to determine whether the memory is corrupt, the image is valid and/or the image is compatible. Similar to the above, corrupt memory, an invalid image, and/or an inaccessible image can result in aborting the load request, and can elicit an error and/or warning message. In other aspects of the invention, loading is aborted without any notification. Such techniques can be utilized to reduce overhead and can be employed when the quantity of memory is limited. After verifying the memory is not corrupted and that the image is valid, the signature can be checked to determine whether the image is compatible with the controller.

Then at 340, the saved image (e.g., state and context, and customer applications) can be transferred from the portable memory to the controller's memory (e.g., flash) at reference numeral 340, and employed by the controller. Additionally, the controller can cycle through a warm boot to facilitate operation (e.g., update the controller's flash memory).

It is to be appreciated that the portable memory can remain interfaced with the controller for subsequent image loads, for example during subsequent startups, as described in detail below. Additionally, the image can be transferred to local memory within the controller, and then loaded from the controller's local memory instead of the portable memory. In other aspects of the invention, the image stored on the portable memory can be written over and/or deleted via a subsequent state and context save, and/or utilized in connection with another controller to port the state and context to the other controller.

FIG. 4 illustrates a methodology 400 to employ a startup state and context image for a controller in accordance with an aspect of the present invention. At 410, portable memory devices operative to the controller are identified. For example, a portable memory device can be coupled to the controller in order to load a saved state and context during controller startup. In addition, the portable memory can be employed in connection with the controller's system memory or as the controller's system memory. However, it is to be appreciated that portable memory may not be interfaced with the controller. For example, the state and context image from portable memory may have previously been transferred to the controller's memory, and the portable memory may have been removed.

If portable memory is not detected, then the controller can be searched for memory that can store state and context, as described below. If portable memory is detected, then the portable memory can be searched for a valid state and context at reference numeral 420. When the portable memory does not include a valid image, then again the controller can be searched for memory with state and context (described below). However, if the portable memory includes a valid image, then at 430, the compatibility of the state and context is determined.

If the state and context is deemed incompatible via a signature, for example, then again the controller can be searched for memory with state and context. As briefly noted, the saved image can include a signature. The signature can be utilized to mitigate employing an incompatible state and context by providing access to the state and context when the signature is compatible with the controller. Upon discerning a compatible image at 430, the saved state and context can be loaded into the controller at 440, and employed as the controller's state and context. In addition, the controller can cycle through a warm boot at 440 to facilitate controller configuration, wherein the memory content (including the state and context) is sustained during the warm boot. Typically, a cold boot will alter the content of the working memory, which can remove and/or corrupt the state and context stored therein.

As noted above, if portable memory, a valid image on the portable memory, or a compatible image on the portable memory is not detected, then at 450 the controller is searched for system memory with a saved state and context. If such memory is not located, then a cold boot is employed at 460. The cold boot can be utilized to set the controller's state and context to a default and/or provide the operator with a mechanism to configure the controller's state and context. If such memory is located, then at 470 the memory is searched for a valid state and context, and if a valid state and context is present, then the state and context is loaded and the controller can proceed through a warm boot at 440. Otherwise, the controller is cycled through a cold boot at 460.

Figure 5:
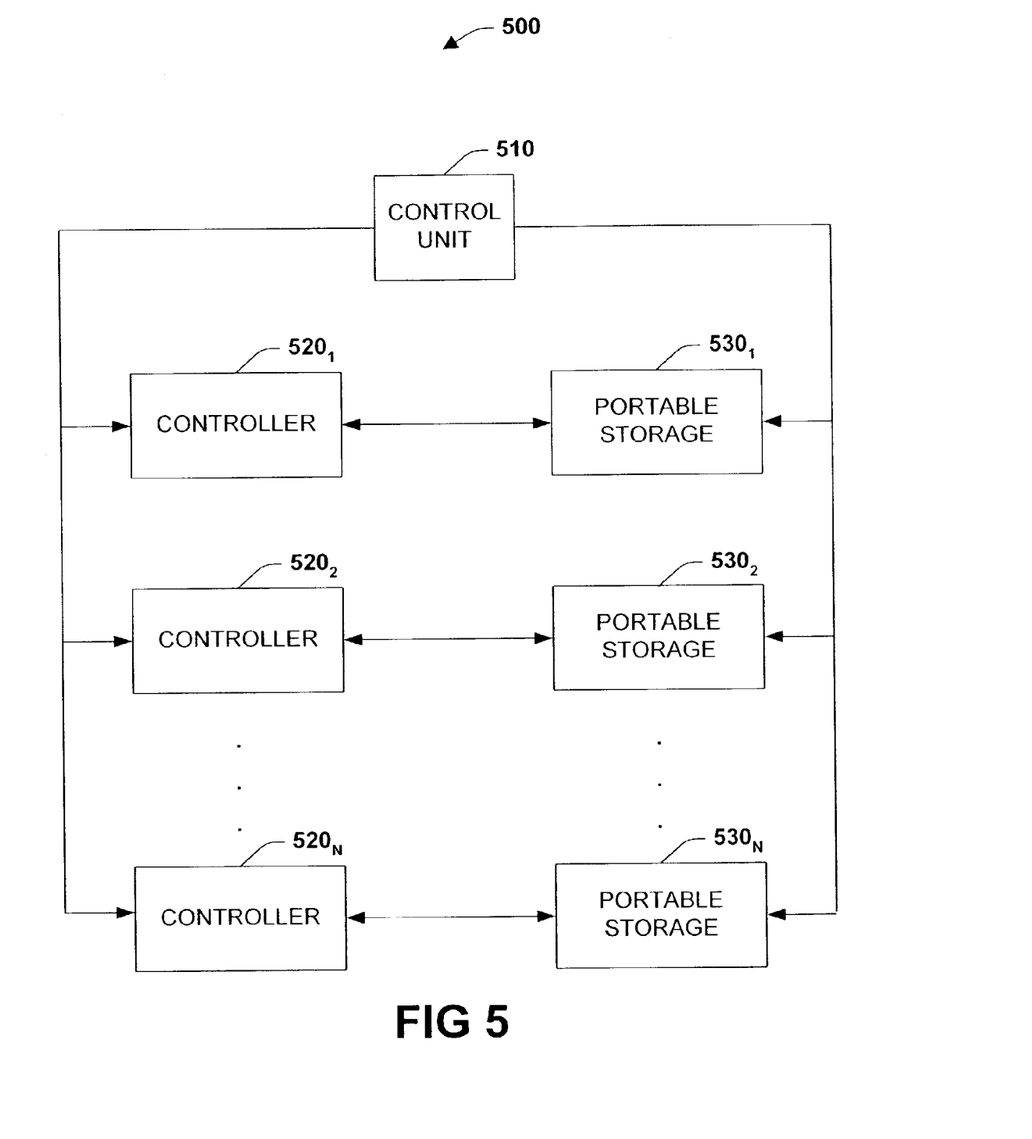
FIG. 5 illustrates an exemplary system that can be employed to save and port state and context between a plurality of controllers and portable memory devices, in accordance with an aspect of the present invention.

FIG. 5 illustrates an exemplary system 500 that can be employed to transfer (e.g., read and write) state and context between one or more controllers and one or more portable storage devices. The system 500 comprises a control unit 510, a controller $520_1$, a controller $520_2$, a controller $520_N$, a portable storage device $530_1$, a portable storage device $530_2$ and a portable storage device $530_N$. The controller $520_1$–$520_N$ can be collectively referred to as controllers 520 and the portable storage device $530_1$–$530_N$ can be collectively referred to as the portable storage devices 530.

The control unit 510 can be an individual computational system such as a computer and a workstation, for example, that can interface to the controllers 520 and/or the portable storage devices 530 via a bus, a network and/or any known data and control communication protocols, including USB (Universal Serial Bus), RS-232, Ethernet (e.g., utilizing category 5, shielded, twisted pair cable) and Firewire, for example. In addition, the control unit 510 can comprise at least one microprocessor, local memory, registers, buffers, a logic unit, a power supply, and other components that are typically associated with devices that can process programmable code, control bus traffic and manage devices. Furthermore, the control unit 510 can interface with components such as a display, a mouse (e.g., optical, a rollerball and wireless), a keyboard, a keypad, a CD read/write, a DVD player, an optical drive, a tape drive, and other input/output (I/O) components. In another aspect of the present invention, the control unit 510 can be a component operatively coupled to a computational system (as described above), wherein the combination of the control unit 510 and the computational system can provide the ability to save and load state and context.

The control unit 510 can be employed to manage the transfer of state and context between the controllers 520 and the portable storage devices 530. For example, after configuring the controllers 520, the associated state and context can be copied to the corresponding portable storage devices 530. Likewise, stored state and context can be ported from the portable storage devices 530 to the controllers 520.

In one aspect of the present invention, the controllers 520 and the corresponding portable storage devices 530 can then be provided to customers, wherein the state and context stored on the portable storage devices 530 can be employed by the customer to facilitate customer configuration of the controllers 520. In another aspect of the present invention, the controllers 520 can be replaced with similar controllers, and the saved state and context can be ported from the portable storage devices 530 to the similar controllers. Thus, one of a plurality of similar controllers can be manually configured, and the remaining similar controllers can be configured via porting the saved state and context to the other similar controllers. In yet another aspect of the present invention, a saved state and context can be ported to one of the controllers 520 wherein the state and context can be modified and then subsequently saved to the corresponding portable storage device 530 to replace the previously saved state and context.

Figure 6:
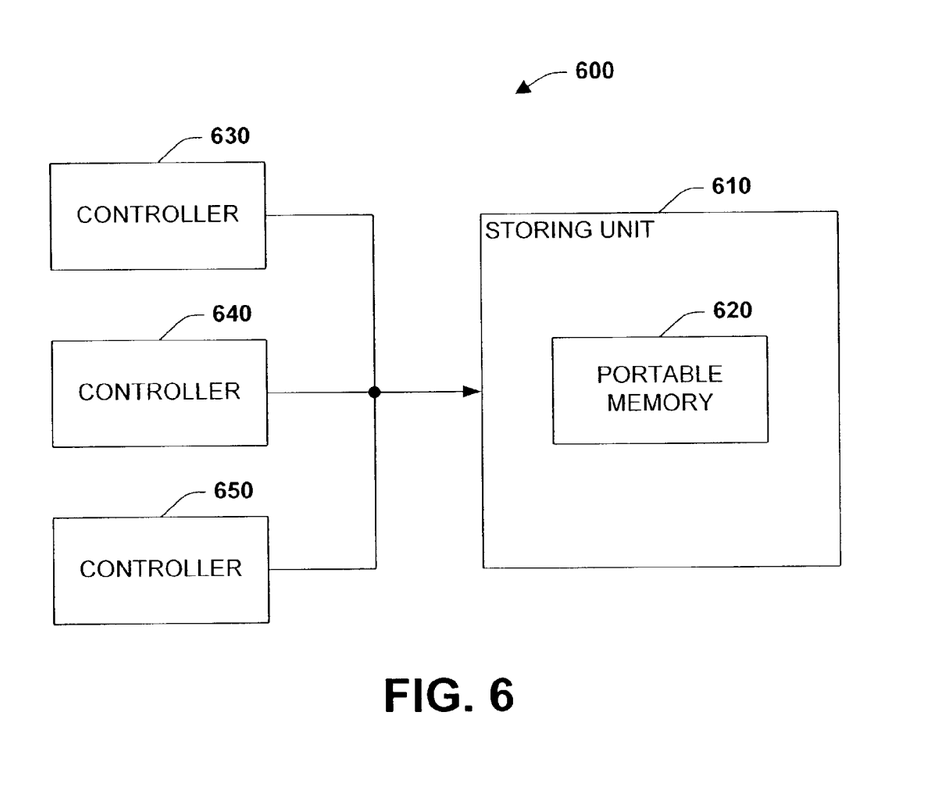
FIG. 6 illustrates an exemplary system to save the state and context associated with one or more controllers to a portable memory device, in accordance with an aspect of the present invention.

FIG. 6 illustrates an exemplary system 600 that can be employed to store state and context from a plurality of controllers to a portable memory. The system 600 comprises a storing unit 610, a portable memory 620, a controller 630, a controller 640 and a controller 650.

The storing unit 610 can be employed to interface the portable memory 620 with the controllers 630–650 and facilitate state and context copying. The storage unit 620 can comprise internal logic to manage the transfer of the controllers 630–650 state and context to the portable memory 620. For example, the storage unit 620 can allocate, or designate memory for each of the controllers 630–650 within the portable memory 620. In addition, the storing unit 610 can determine which of the controllers 630–650, including none and all, can write to the portable memory 620.

Figure 7:
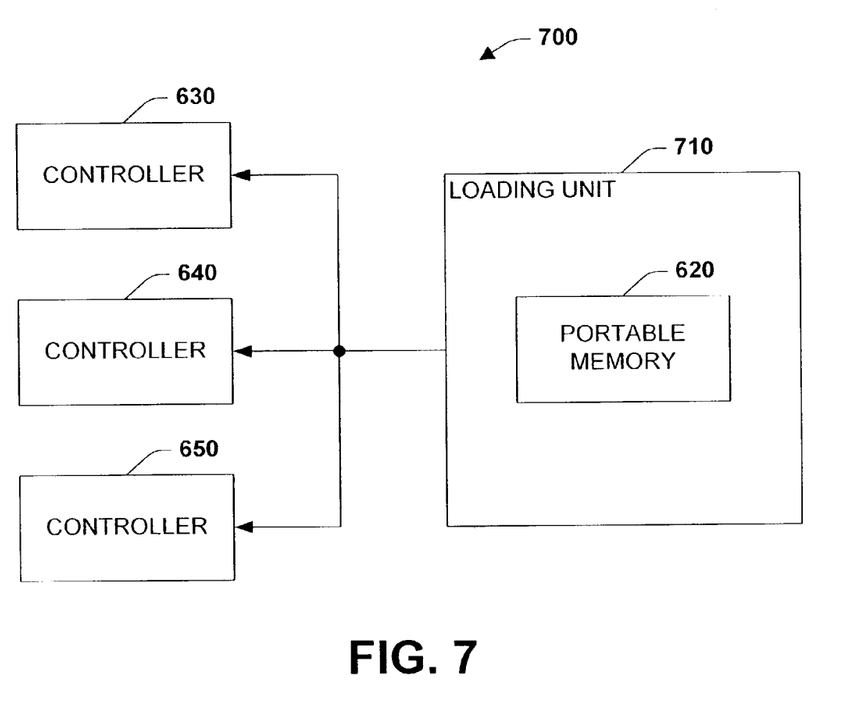
FIG. 7 illustrates an exemplary system to load state and context a portable memory device to one or more controllers, in accordance with an aspect of the present invention.

In one aspect of the present invention, the portable memory 620 comprises at least enough storage space to save the state and context of the controllers 630–650 and indicia identifying which state and context image corresponds to which controller. After storing the state and context of the controllers 630–650 to the portable memory 620, the portable memory 620 can be employed to port the saved state and context, for example via the system 700 described next.

FIG. 7 illustrates an exemplary system 700 that can be employed to port state and context from portable memory to a plurality of controllers. The system 700 comprises a loading unit 710, the portable memory 620 and the controllers 630. Similar to the storing unit 610, the loading unit 710 can interface the portable memory 620 and the controllers 630–650. The loading unit 710 can be utilized to port the state and context to any and/or all of the controllers 630–650. For example, the loading unit 710 can be employed to load a different image to each of the controllers 630–650. In another example, the loading unit 710 can be employed to load a similar state and context to the controllers 630–650.

Figure 8:
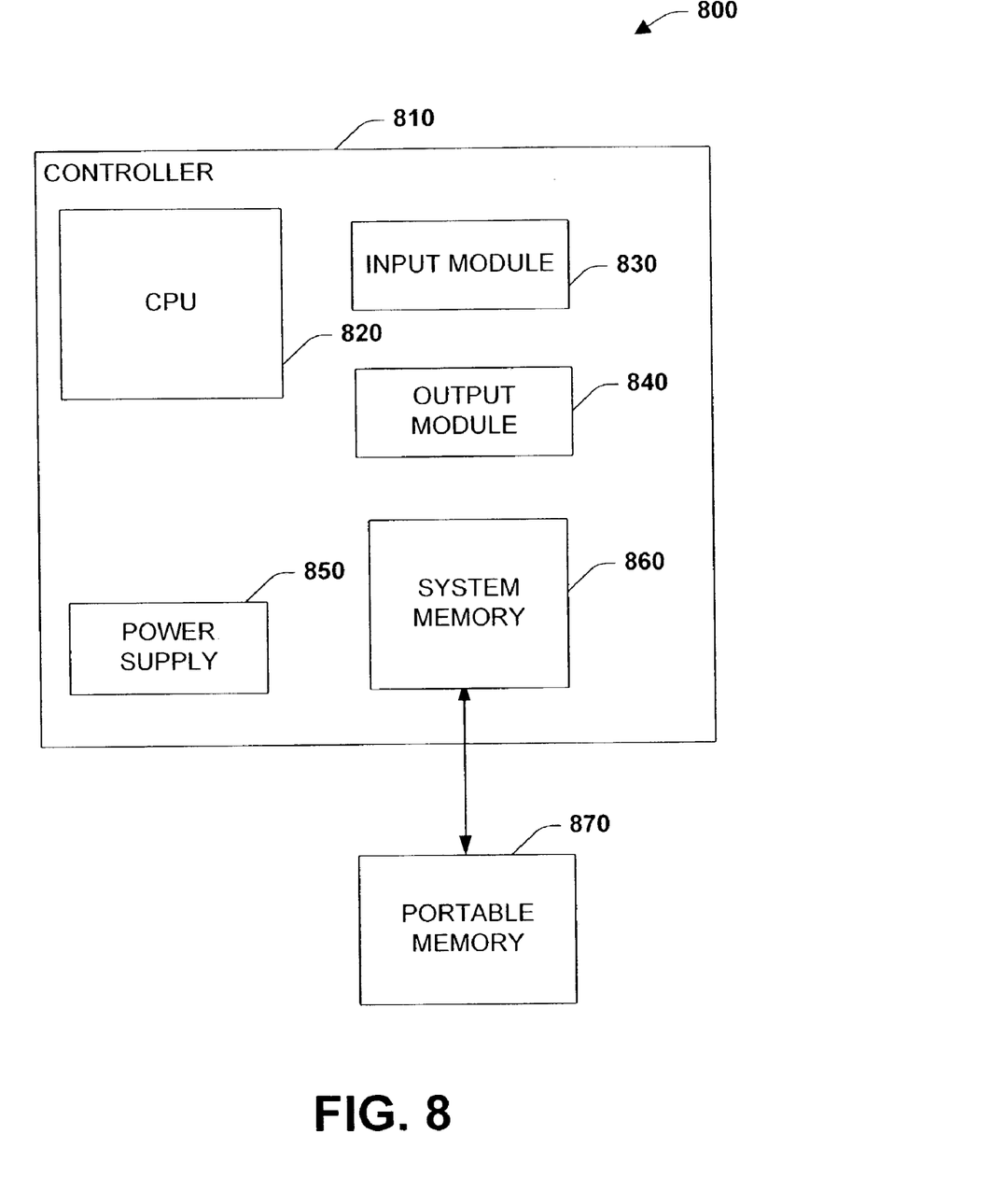
FIG. 8 illustrates an exemplary controller that can be employed in accordance with an aspect of the present invention.

FIG. 8 illustrates an industrial control system 800 in accordance with an aspect of the current invention. The industrial control system 800 can be utilized to control industrial processes, manufacturing processes, methods, plants, machines, equipment, devices, instruments and apparatuses, for example. The system 800 comprises a controller 810, a control processing unit (CPU) 820, an input module 830, an output module 840, an on-board power supply 850, a system memory 860 and a portable memory 870. It is to be appreciated that the controller 800 can include various other components (e.g., hardware and software), and can be designed for specific applications. Furthermore, the controller 800 can be used in connection with others controllers, for example controllers residing on the same backplane and/or rack.

The CPU 820 can facilitate data reads and writes, perform operations and execute instructions in connection with the controller 810. The input module 830 and the output module 840 can be employed to convey information between the controller 810 and the environment. The on-board power supply 850 can be employed to convert and distribute power to at least one other component of the controller 810. The system memory 860 can be utilized to store application code, instructions, data, addresses, user programs, variables, data tags and tables.

Typically, the state and context of the controller 810 resides in the system memory 860, which can comprise volatile and non-volatile memory such as synchronous dynamic RAM (SDRAM), dynamic RAM (DRAM), fast page RAM (FPRAM) and extended data-out RAM (EDO-RAM), for example. The volatile RAM is commonly utilized by for the operating system, run time applications and user programs. The non-volatile memory typically retains its contents, even without power. Examples of non-volatile memory include flash memory, hard disk, programmable read only memory (PROM) and ROM. Flash and hard disk memory are read/write; That is, they can be written to and read from multiple times. PROM memory exists in write-once form. Once the write is performed, then the memory can only be read. Two variations of PROM are erasable programmable ROM (EPROM), which can be erased with the aid of WV light before programming, and electrically erasable programmable ROM (EEPROM), which can be electrically written over. ROM is typically strictly read only. For controllers, ROM is commonly the area where the basic input/out system (BIOS) and OS are located.

As depicted, the controller 810 can be interfaced to the portable memory 870. The portable memory can be employed to save the state and context of the controller 810 in a sustainable memory for subsequent start-ups, and/or to port a particular state and context to similar controllers. The similar controllers can then employ the state and context as a start-up image.

Figure 9:
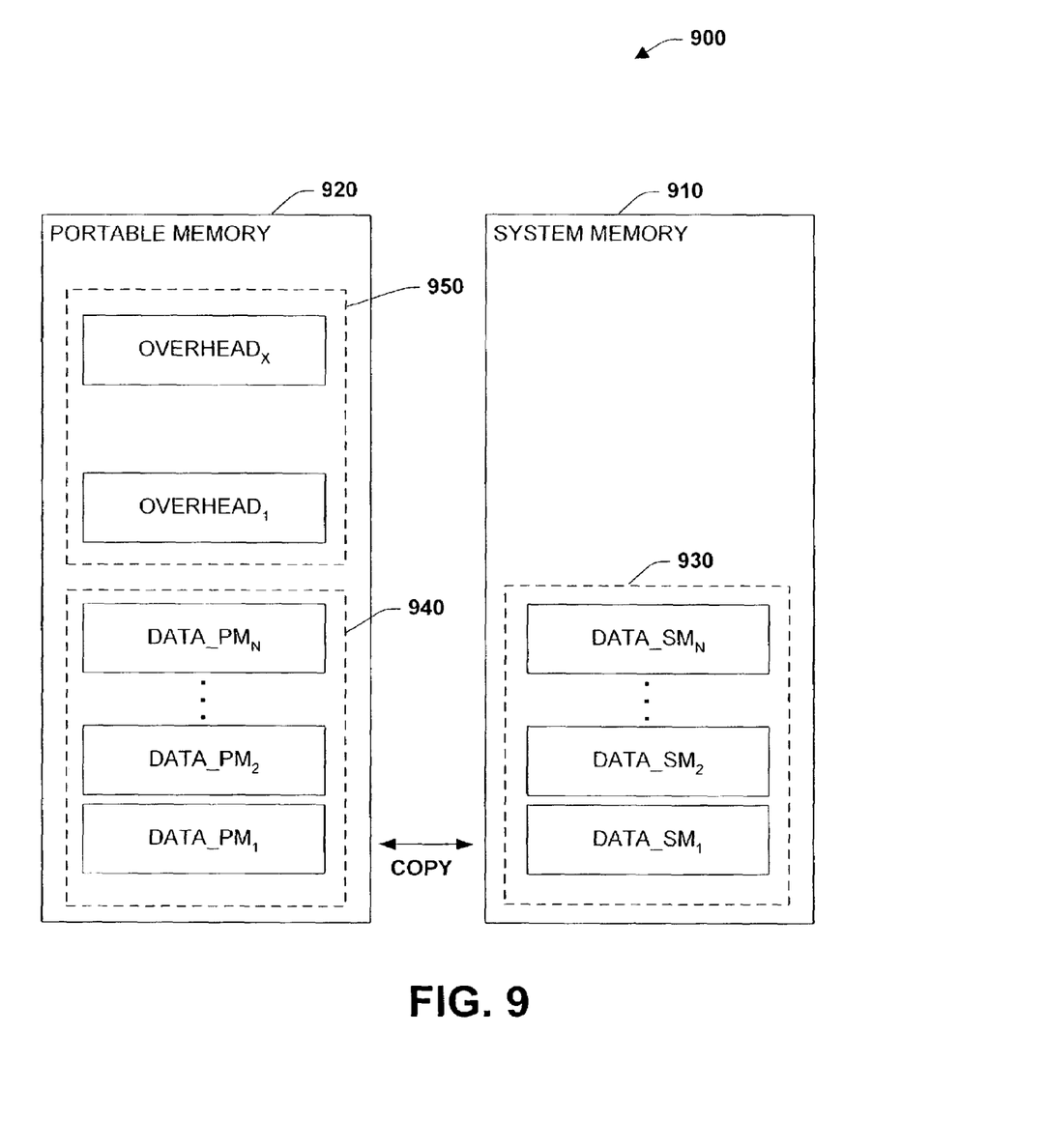
FIG. 9 illustrates an exemplary data transfer technique that can be employed in accordance with an aspect of the present invention.

FIG. 9 illustrates a data transfer technique 900 that can be employed to transfer state and context between controller system memory and portable memory in accordance with an aspect of the present invention. The transfer technique 900 can be employed, for example, to copy a controller's state and context from a system memory 910 to a portable memory 920 and state and context from the portable memory 920 to the controller's system memory 910.

In one aspect of the present invention, the operating state and context of the controller can reside in a memory bank 930, within the system memory 910, that comprises memory $Data\_SM_1$–$Data\_SM_N$. After receiving a save state and context request, the controller's state and context can be copied from the memory bank 930 to the memory bank 940 within the portable memory 920. For example, $Data\_SM_1$ can be copied to $Data\_PM_1$, $Data\_SM_2$ can be copied to $Data\_PM_2$, and $Data\_SM_N$ can be copied to $Data\_PM_N$. Thus, after saving the controller's state and context, the portable memory data bank 940 can comprise a copy of system memory data bank 930. In addition, the portable memory 920 can further include overhead 950, which can include, for example, information relating to the saved state and context.

It can be appreciated that a similar scheme can be employed to port and/or load state and context from portable flash memory 920 to the system memory 910, for example, after receiving a load request. For example, Data_$PM_1$ can be copied to Data_$SM_1$, Data_$PM_2$ can be copied to Data_$SM_2$, and Data_$PM_N$ can be copied to Data_$SM_N$. Thus, after porting the saved state and context, the system memory data bank 930 can comprise an operating copy of the state and context.

Figure 10:
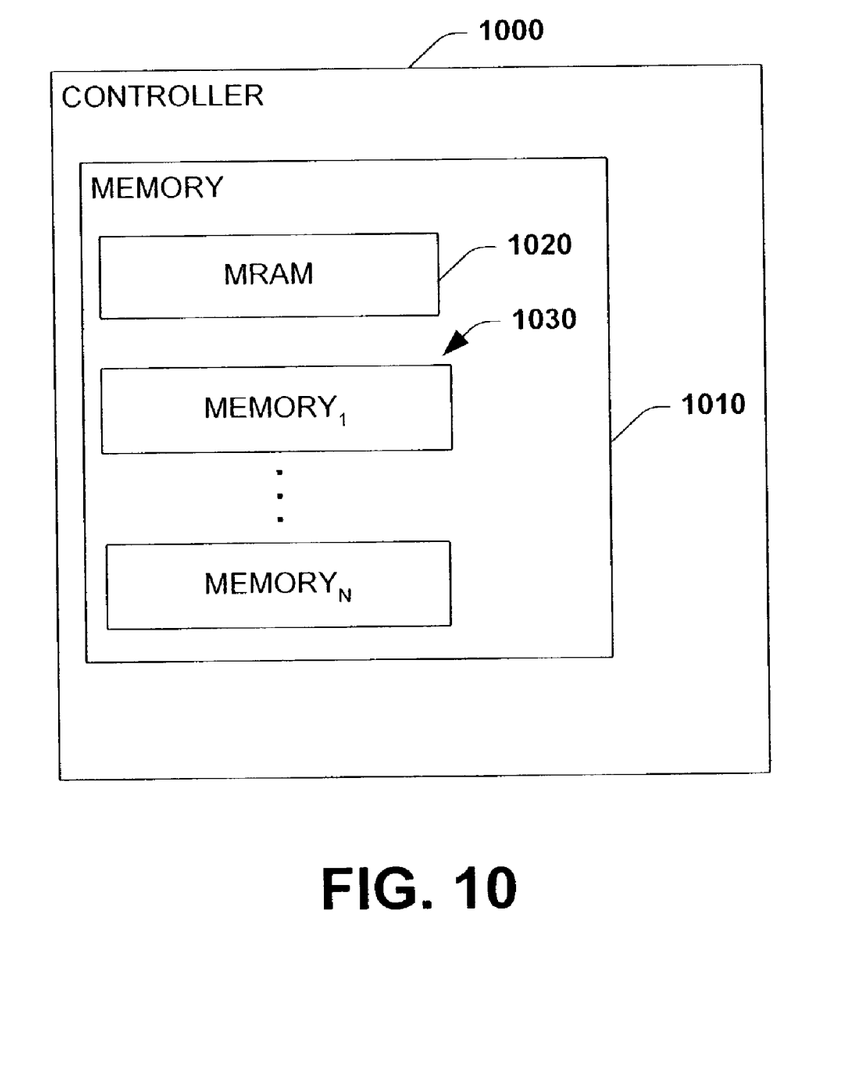
FIG. 10 illustrates an exemplary memory configuration that can be employed, in accordance with an aspect of the present invention.

FIG. 10 illustrates a controller 1000 that can be employed with the systems and methods described herein. The controller 1000 comprises a memory 1010 that includes a magnetoresistive random access memory (MRAM) 1020, and optionally, additional memory 1030 such as local memory.

In general, the MRAM 1020 can be constructed similarly to integrated DRAM, wherein cells can be arranged in substantially parallel row lines and column lines. The parallel row lines are typically transversely aligned to the column lines. Typically, each of the memory cells is wired between one of the row lines and one of the column lines, and electrically connected to the respective column line and row line. The column lines can be connected to an amplifier that reads the data signal of the memory cells. Reading can be accomplished by measuring a detectable current on the column line.

Unlike DRAM, the MRAM 1020 generally does not include diodes or transistors to connect memory cells to respective column lines for addressing. Thus, the MRAM 1020 can provide for various memory cell arrangements such as stacking cells, for example. One advantage of the foregoing is that the MRAM 1020 can be constructed within a smaller footprint. The size reduction additionally provides for constructing MRAM that is similar in size to DRAM and/or flash memory, but includes more memory bits per chip.

The MRAM 1020 additionally provides memory that does not require power to operate and/or sustain its content. Thus, employing the MRAM 1020 as a removable, or portable memory device provides the ability to save controller state and context and employ the saved image as a start-up image for the controller and/or port the saved image to substantially similar controllers. Thus, the MRAM 1020 can be utilized in a manner similar to the portable and flash memory described herein.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates transferring a state and context between a controller and a portable storage component, comprising:
a portable storage component; and,
a component that facilitates transferring the state and context between the controller and the portable storage component, wherein the controller employs an open operating system and the portable storage component.

2. The system of claim 1, employed in connection with at least one of an industrial controller and a programmable logic controller.

3. The system of claim 1, the portable storage component comprising non-volatile memory.

4. The system of claim 3, the non-volatile memory comprising at least one of flash memory and MRAM memory.

5. The system of claim 1, the component activated to facilitate the transfer of state and context by one of a manual and an automatic activation mechanism.

6. The system of claim 5, the manual activation mechanism comprising at least one of a switch, a lever, a button, voice activation, a software application and a software menu.

7. The system of claim 5, the automatic activation mechanism comprising at least one of an event, an interrupt, a control signal, a preset time interval, a statistical inference, a master device, an electrical signal, an optical signal, a bit and a flag.

8. A method to facilitate saving a state and context associated with a controller to a portable memory, comprising:
employing an open operating system in connection with the controller;
receiving a save request;
detecting the portable memory; and,
saving the state and context of the controller to the portable memory.

9. The method of claim 8, the save request initiated by one of a manual and an automatic activation mechanism.

10. The method of claim 8, detecting the portable memory based on at least one of a polling technique and plug-and-play technology.

11. The method of claim 8, further comprising aborting the save request if portable memory is not detected.

12. The method of claim 8, further comprising saving customer applications to the portable memory.

13. The method of claim 8, further comprising saving a signature associated with the state and context to the portable memory.

14. The method of claim 13, the signature employed to identify at least one of the controller's hardware and software configuration.

15. The method of claim 13, the signature employed to provide or deny access to the state and context saved on the portable memory.

16. The method of claim 8, further comprising validating the state and context saved on the portable memory.

17. The method of claim 8, further comprising detecting whether a valid state and context has been previously saved to the portable memory.

18. The method of claim 17, further comprising aborting the save request if a valid state and context is detected.

19. The method of claim 17, further comprising rendering a decision whether to continue saving state and context if a valid state and context is detected.

20. The method of claim 17, further comprising one of removing, invalidating, tagging, writing over and archiving the previously saved valid state and context.

21. The method of claim 8, employed in connection with at least one of an industrial controller and a programmable logic controller.

22. The method of claim 8, the portable storage component comprising non-volatile memory.

23. The method of claim 22, the non-volatile memory comprising at least one of flash memory and MRAM memory.

24. A method to facilitate loading a state and context saved on a portable memory device to a controller employing an open operating system, comprising:
   receiving a load request;
   detecting the portable memory;
   detecting whether the state and context saved on the portable memory is valid; and,
   loading the valid state and context to the controller.

25. The method of claim 24, further comprising aborting the load request if portable memory is not detected.

26. The method of claim 24, further comprising aborting the load request if a valid state and context is not detected.

27. The method of claim 24, further comprising notifying the operator if at least one of the portable memory and the valid state and context is not detected.

28. The method of claim 24, further comprising detecting a signature associated with the state and context.

29. The method of claim 28, employing the signature to determine whether the state and context are compatible with the controller.

30. The method of claim 24, further comprising loading saved customer applications to the controller.

31. The method of claim 24, further comprising warm booting the controller to facilitate controller operation with the loaded state and context.

32. The method of claim 24, the portable storage component comprising non-volatile memory.

33. The method of claim 31, the non-volatile memory comprising at least one of flash memory and MRAM memory.

34. A method to facilitate employing state and context saved from a portable memory device as a startup image for a controller employing an open operating system, comprising:
   coupling the portable memory with the state and context to the controller;
   detecting the portable memory;
   ensuring the state and context are valid;
   checking the compatibility of the state and context; and,
   loading the state and context to the controller.

35. The method of claim 34, the portable memory employed as the controller's memory.

36. The method of claim 34, further comprising warm booting the controller after loading the state and context to the controller.

37. The method of claim 34, further comprising detecting a controller memory if the portable memory is not detected.

38. The method of claim 37, detecting whether a state and context is stored in the controller memory.

39. The method of claim 38, loading the state and context if it is valid.

40. The method of claim 39, further comprising warm booting the controller after loading the valid state and context.

41. The method of claim 37, further comprising cold booting if the controller memory is not detected.

42. The method of claim 38, further comprising cold booting if the state and context is not detected.

43. A controller state and context porting system, comprising:
   means for interfacing portable memory and an industrial controller,
   means for saving a controller state and context to the portable memory, and
   means for loading the state and context from the portable memory to one or more similar industrial controllers.

44. The system of claim 43, further comprising means for sensing a request to transfer state and context between the portable memory and the one or more industrial controllers.

45. The system of claim 43, further comprising means for detecting the attached portable memory.

46. The system of claim 43, further comprising means for validating the copied state and context of the saved controller state and context on the portable memory.

47. A system to save and load a controller state and context to controllers that employ an open operating system, comprising:
   at least one controller interfaced with a control unit;
   at least one portable storage medium interfaced with the control unit;
   a communications channel interfacing at least one controller with at least one portable storage medium, and
   the control unit facilitating the transfer of the state and context between at least one controller and at least one portable storage medium, wherein the transfer of the state and context can occur concurrently when more than one controller and more than one portable storage medium are employed.

48. A system to save information from one or more controllers to a portable storage component, comprising:
   at least one controller interfaced with a storing unit;
   a portable storage component interfaced with the storing unit, and
   the storing unit facilitating the transfer of a state and context between the one or more controllers and the portable storage component.

49. A system to load at least one state and context to one or more controllers, comprising:
   at least one controller interfaced with a loading unit;
   a portable storage component interfaced with the loading unit, and
   the loading unit facilitating the transfer of at least one state and context from the portable storage component to the one or more controllers.

* * * * *